US012388698B2

(12) United States Patent
Sundberg et al.

(10) Patent No.: US 12,388,698 B2
(45) Date of Patent: Aug. 12, 2025

(54) CONTEXT AWARE DATA RECEIVER FOR COMMUNICATION SIGNALS BASED ON MACHINE LEARNING (71) Applicant: Telefonaktiebolaget LM Ericsson (publ), Stockholm (SE)

(72) Inventors: Mårten Sundberg, Årsta (SE); Henrik Rydén, Stockholm (SE); Hamed Farhadi, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 365 days.

(21) Appl. No.: 17/928,125

(22) PCT Filed: Jun. 25, 2020

(86) PCT No.: PCT/SE2020/050660
§ 371 (c)(1),
(2) Date: Nov. 28, 2022

(87) PCT Pub. No.: WO2021/262052
PCT Pub. Date: Dec. 30, 2021

(65) Prior Publication Data
US 2023/0216724 A1 Jul. 6, 2023

(51) Int. Cl.
H04L 27/26 (2006.01)
G06N 3/045 (2023.01)
(Continued)

(52) U.S. Cl.
CPC ....... H04L 27/26412 (2021.01); G06N 3/045 (2023.01); G06N 3/0464 (2023.01); H04L 27/3483 (2013.01)

(58) Field of Classification Search
None
See application file for complete search history.

(56) References Cited

U.S. PATENT DOCUMENTS

| 8,189,696 B2 * | 5/2012 | Lee ................. H04L 25/03178 375/267 |
| 2010/0158159 A1 | 6/2010 | Lee et al. |

(Continued)

FOREIGN PATENT DOCUMENTS

| CN | 108462517 A | 8/2018 |
| CN | 108650201 A | 10/2018 |

(Continued)

OTHER PUBLICATIONS

Musumeci, F. et al, "An Overview on Application of Machine Learning Techniques in Optical Networks", IEEE Communications Surveys & Tutorials, vol. 21, Issue 2, Nov. 8, 2018, pp. 1-27, IEEE.
Raj, V. et al., "Design of Communication Systems Using Deep Learning: A Variational Inference Perspective", IEEE Transactions on Cognitive Communications and Networking, vol. 6 No. 4, Dec. 1, 2020, pp. 1320-1334, IEEE.

(Continued)

Primary Examiner — Angela Nguyen
(74) Attorney, Agent, or Firm — COATS & BENNETT, PLLC (57) ABSTRACT A computer implemented method for detecting data (y) comprised in a part (x) of a received signal (w) of a communication system (100), wherein the received signal (w) is associated with a population and where the part (x) of the received signal (w) is associated with a sub-population of the population, the method comprising: configuring (S1) a first function (f1) to determine a context (c) of the received signal (w), wherein the context (c) is indicative of a state of the received signal (w), configuring (S2) a second function (f2) to detect the data (y) based on the part (x) of the received signal, wherein the second function (f2) is arranged to be parameterized by the context (c), and detecting (S3) the data (y) by the first (f1) and second (f2) functions.

18 Claims, 5 Drawing Sheets (51) Int. Cl.
　　　*G06N 3/0464*　　(2023.01)
　　　*H04L 27/34*　　(2006.01)

(56) References Cited

U.S. PATENT DOCUMENTS

| | | | |
|---|---|---|---|
| 2020/0177418 A1 | 6/2020 | Hoydis et al. | |
| 2021/0081477 A1* | 3/2021 | Tibbet | G06F 16/2465 |
| 2024/0414555 A1* | 12/2024 | Montalvo | G06N 20/10 |

FOREIGN PATENT DOCUMENTS

| | | |
|---|---|---|
| CN | 109120563 A | 1/2019 |
| CN | 109194595 A | 1/2019 |
| CN | 110099019 A | 8/2019 |
| EP | 3633944 A1 | 4/2020 |

OTHER PUBLICATIONS

Jarajreh, M. et al., "Artificial Neural Network Nonlinear Equalizer for Coherent Optical OFDM", IEEE Photonics Technology Letters, vol. 27 No. 4, Feb. 15, 2015, pp. 387-390, IEEE.

Lee, T. et al., "Channel Estimation and Data Detection in the Presence of Phase Noise in MIMO-OFDM Systems With Independent Oscillators", IEEE Access, vol. 5, Jun. 28, 2017, pp. 9647-9662, IEEE.

Gao, X. et al., "ComNet: Combination of Deep Learning and Expert Knowledge in OFDM Receivers", IEEE Communications Letters, vol. 22 No. 12, Dec. 1, 2018, pp. 2627-2630, IEEE.

Liu, L. et al., "OLS-Based RBF Neural Network for Nonlinear and Linear Impairments Compensation in the CO-OFDM System", IEEE Photonics Journal, vol. 10 No. 2, Apr. 1, 2018, pp. 1-9, IEEE.

* cited by examiner

CONTEXT AWARE DATA RECEIVER FOR COMMUNICATION SIGNALS BASED ON MACHINE LEARNING

TECHNICAL FIELD

The present disclosure relates to data receivers and transmitters for use in both wired and wireless communication networks. There are disclosed methods and devices for detecting data in a received signal where the detection processing is adapted to current receiver and/or transmitter conditions based on machine learning.

BACKGROUND

Common to most data receivers is that they will experience varying operating conditions over time and/or frequency and/or space. The performance of the receiver in terms of, e.g., detection error or power consumption, can be improved by adapting to the conditions in which the receiver is currently operating, such as low vs high signal to noise ratio (SNR), additive vs multiplicative noise, and/or flat vs frequency selective fading conditions.

Receivers that adapt received signal processing to current operating conditions are known. For instance, in the fourth generation (4G) and fifth generation (5G) communication systems defined by the third-generation partnership project (3GPP), there are reference signals sent out to enable, e.g., channel estimation, which signals can be used for receiver adaptation to current operating conditions.

Other contextual changes in receiver operating conditions can, however, be more challenging to identify and/or adapt receiver operation to. Such changes in receiver context could include for example hardware impairments at the transmitter and/or receiver, such as phase noise, power amplifier (PA) nonlinearity, phase and/or gain imbalances, direct current (DC) leakage, and filter ripples.

Recently, machine learning approaches have been proposed to tackle the receiver adaptation problem. For example, the papers by M. A. Jarajreh et al., "Artificial neural network nonlinear equalizer for coherent optical OFDM," *IEEE Photon. Technol. Lett.*, vol. 27, no. 4, pp. 387-390, Feb. 15, 2015, and L. Liu, M. Bi, S. Xiao, J. Fang, T. Huang, and W. Hu, "OLS-based RBF neural network for nonlinear and linear impairments compensation in the CO-OFDM system," *IEEE Photon. J.*, vol. 10, no. 2, April 2018, both discuss applications of machine learning for receiver optimization to account for varying receiver conditions.

However, despite of this and other recent work in the field, there is a need for improved methods of detecting data in a received communications signal.

SUMMARY

It is an object of the present disclosure to provide methods, receivers, and other devices for detecting data comprised in a part of a received communications signal which alleviate at least some of the drawbacks associated with known systems.

This object is at least partly obtained by a computer implemented method for detecting data comprised in a part of a received signal of a communication system. The received signal is associated with a population whereas the part of the received signal is associated with a sub-population of the population. The method comprises configuring a first function to determine a context of the received signal. This context is indicative of a state of the received signal and represents a compact description of the current receiver operating conditions. The method also comprises configuring a second function to detect the data based on the part of the received signal, wherein the second function is arranged to be parameterized by the context. The method then detects the data by the first and by the second functions.

By separating the (total) population of samples and the sub-population of samples during the detection, using a compact representation of the total population to adapt the receive processing of the sub-population in an efficient manner, several advantages are obtained. For instance, the set-up becomes easier to train and to maintain, as well as to analyze. Computational complexity is also reduced due to the split between context generation and actual data detection. The method results in reliable detection of data despite challenging receiver operating conditions comprising multiplicative noise such as phase noise and non-linear effects due to, e.g., imperfections in power amplifiers at the transmit side, as will be exemplified in the following. The methods disclosed herein are quite general and can be performed by any of a wireless receiver, a wireline receiver, or an optical receiver.

According to aspects, the context is a finite length vector of values. This finite length vector of values simplifies overall system design and is easy to transmit internally and externally, as well as to analyze during, e.g., receiver diagnostics tests.

According to aspects, a dimensionality of the context is smaller than a dimensionality of a receiver operating condition associated with the population. This means that the context is a compact representation of the current receiver operating conditions, which is an advantage. This reduction in dimensionality allows for a reduction in overall receiver complexity.

According to aspects, the first function comprises any of; a fully-connected neural network (FC NN), a convolutional neural network (CNN), a generative model, a clustering algorithm such as a Gaussian mixture model (GMM), k-means clustering, or fuzzy c-means clustering algorithm, a compact representation of the estimated distribution based on an orthonormal basis of the space, such as Fourier series coefficients of an estimated probability density function (PDF), or a kernel density estimation (KDE), method configured to infer an underlying distribution of the population based on a finite set of data samples. It is an advantage that several different functions can be used to their respective advantages depending on how and where the methods are to be used.

According to aspects, the first function is a classifier configured to classify the received signals into one out of a pre-determined number of discrete contexts. This allows, e.g., for implementing the second function as a set of sub-functions, where the method comprises selecting a sub-function out of the set of sub-functions for detecting the data based on the context. This means that a suitable function for detection is selected depending on current receiver operating conditions using the context as a compact selection variable. Each sub-function may be associated with a respective receiver operating context for which it has been optimized. This allows for selecting functions in dependence of foreseen receiver contexts, which functions can be trained or optimized specifically for a given context.

There are also disclosed herein receivers, network nodes, computer programs, and computer program products associated with the above-mentioned advantages.

BRIEF DESCRIPTION OF THE DRAWINGS

The present disclosure will now be described in more detail with reference to the appended drawings, where.

DETAILED DESCRIPTION

Aspects of the present disclosure will now be described more fully hereinafter with reference to the accompanying drawings. The different devices, systems, computer programs and methods disclosed herein can, however, be realized in many different forms and should not be construed as being limited to the aspects set forth herein. Like numbers in the drawings refer to like elements throughout.

The terminology used herein is for describing aspects of the disclosure only and is not intended to limit the invention. As used herein, the singular forms "a", "an" and "the" are intended to include the plural forms as well, unless the context clearly indicates otherwise.

Figure 1:
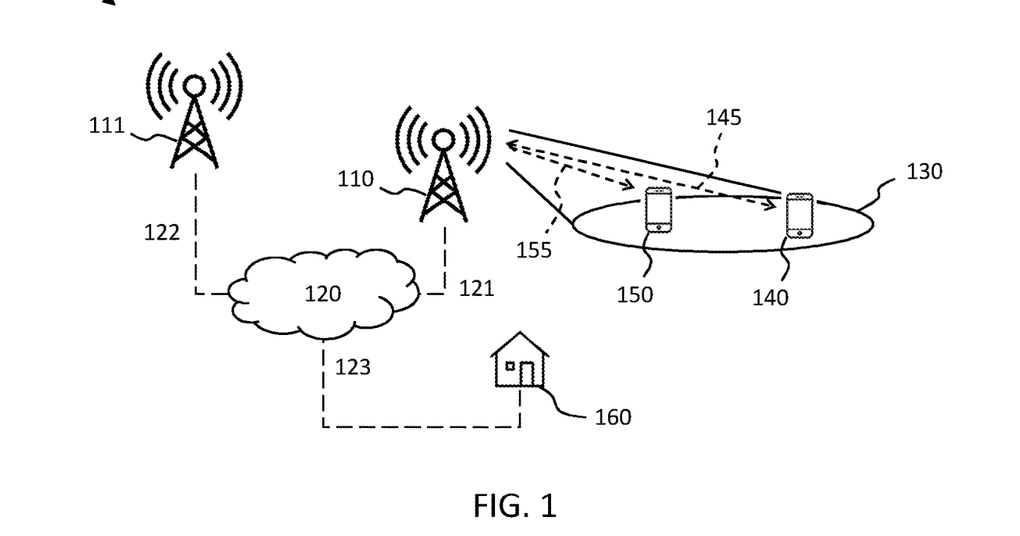
FIG. 1 shows example communication networks.

FIG. 1 illustrates an example communication network 100 where access points 110, 111 provide wireless network access to wireless devices 140, 150 over a coverage area 130. The access points in a fourth generation (4G) 3GPP network are normally referred to as an evolved node B (eNodeB), while the access points in a fifth generation (5G) 3GPP network are often referred to as a next generation node B (gNodeB). The access points 110, 111 are connected to some type of core network 120, such as an evolved packet core network (EPC). The EPC is an example of a network which may comprise wired communication links, such as optical links 121, 122. Asymmetric digital subscriber line (ADSL) communication networks 123 constitute another example or a wired communications network. ADSL may, e.g., be used to connect stationary users 160 to the core network 120.

The wireless access network 100 supports at least one radio access technology (RAT) for communicating 145, 155 with wireless devices 140, 150. It is appreciated that the present disclosure is not limited to any particular type of wireless access network type or standard, nor any particular RAT. The techniques disclosed herein are, however, particularly suitable for use with 3GPP defined wireless access networks.

The present disclosure relates to receivers and to methods for detecting information, i.e., data, in a received signal in a communication system 100 such as that illustrated in FIG. 1. A receiver in this invention is to be construed broadly, referring to an entity that receives some transmitted data. The data can be transmitted e.g. over a wireless channel 145, 155, through an optical fiber 121, 122, or through other wired channels, e.g., ADSL communication links 123. Common to all receivers discussed herein is that they will experience conditions over time and/or frequency and/or space that are unknown and need to be estimated to achieve optimal receiver performance. These conditions can also vary, over e.g. time or frequency. Under each condition, or context, a receiver may adapt its mode of operation in order to improve detection performance. A well-known example of varying receiver context in a wireless access network is variation in received signal to noise ratio (SNR). The useful signal power in the received communication signal tends to vary as the wireless device 140, 150 moves over the coverage area 130 due to variation in propagation path loss, and multipath fading.

The variation in receiver conditions due to, e.g., hardware imperfections at the transmitter and/or at the receiver, is normally dependent on both time and frequency, depending on various known factors. Variation in receiver conditions are commonly also seen over space. For instance, multi-antenna systems may experience variation in receiver conditions depending on which antenna out of a set of antennas that is used for receiving and processing a communications signal.

Easy-to-detect changes in time and/or frequency and/or space, such as the variation in SNR mentioned above can be estimated and compensated for in a relatively straight forward manner using known methods. Communication systems are also typically designed to be able to make low-complex estimates of certain context variations. In the 5G/NR systems there are reference signals transmitted which can be used to determine current receiver context.

For instance, a demodulation reference signal (DMRS) is defined in 5G in order to facilitate channel estimation. The DMRS is transmitted on demand and used to estimate the radio channel between access point and wireless device. Multiple orthogonal DMRSs can be allocated to support multiple-input multiple-output (MIMO) transmission. A phase tracking reference signal (PTRS) is also specified which enables tracking of a common phase noise in the wireless access system. The phase noise of a transmitter normally increases as the frequency of operation increases. The PTRS plays an important role especially at millimeter wave frequencies to minimize the effect of the oscillator phase noise on overall system performance.

Other contextual changes can however be challenging to identify, and, even if being identifiable it could be challenging to adapt a receiver to accommodate according to the new context, i.e., to represent the context in a way that is useful to the receiver while keeping complexity at reasonable levels using the known methods. Such more challenging changes in context could for example include hardware impairments at the transmitter and/or receiver, comprising phase noise, power amplifier (PA) nonlinearities, in-phase and quadrature (I/Q) phase and gain imbalances, direct current (DC) leakage, filter ripple, and so on.

A problem with existing solutions for receiver context adaptation can be exemplified by soft bit estimation. Soft bit estimation refers to methods of data detection which provide likelihoods, or soft values, instead of hard decisions for the data bits in a received message. Soft estimation of bits can be used as input to a soft-decision decoder which is a kind of decoding method or class of algorithm used to decode data that has been encoded with an error correcting code. Whereas a hard-decision decoder operates on data that take on a fixed set of possible values (typically 0 or 1 in a binary code), the inputs to a soft-decision decoder may take on a whole range of values in-between. This extra information indicates the reliability of each input data point and is used to form better estimates of the transmitted data.

In this example, the task is to estimate the log-ratio between the likelihood that a '1' or a '0' was transmitted, also referred to as log-likelihood-ratio (LLR). The example will be used throughout the disclosure, although it is appreciated that the methods disclosed herein can be applied to a much wider range of applications than this particular example.

In a conventional receiver, when performing soft bit estimation, it is usually assumed that all received samples follow an uncorrelated Gaussian likelihood function, $$f(r) = \frac{1}{\sqrt{2\pi}\sigma} e^{-\frac{|r-s|^2}{2\sigma^2}},$$

where $\sigma^2$ is an estimated or otherwise obtained noise variance, r is the received symbol (normally after equalization) and s is the hypothesis that symbol s was transmitted (out of an alphabet size of M possible symbols, e.g. 16 for 16-QAM).

As can be seen from the likelihood function $f(r)$ based on the Gaussian assumption shown above, to find the maximum likelihood, the only parameters of relevance are the estimated noise variance ($\sigma^2$) and the value of the received symbol r. Hence, the receiver need only consider these two parameters for determining the soft bit magnitude. The soft bit estimation can thus be performed per transmitted/received symbol with an assumption that the underlying likelihood function does not change across symbols.

However, this approach most likely fails to handle cases in which the likelihood function changes over any of the time/frequency/space dimensions, apart from a varying noise variance. This can e.g. happen when the received signal is subject to hardware impairments which cause variation in receiver condition over one or more of the time, frequency, and or space dimensions. These impairments may arise due to a large number of causes, so accurately describing the current receiver conditions is a complicated task. Thus, a compact representation of receiver operating condition is desired which can be used to efficiently adapt receiver processing to the current prevailing conditions.

A population is herein to be construed as a set of samples that are assumed to follow the same underlying distribution for at least one property of the samples. A sub-population is then a single sample, or a smaller set of samples taken from the larger population.

The techniques disclosed herein exploit information in samples from a larger population in order to generate a compact representation of receiver context. The context c may, according to one way of viewing the techniques disclosed herein, be indicative of a statistical distribution of received data symbols.

A sub-set of the samples which represent a sub-population and comprises the data to be detected, is then processed in a manner which depends on the compact context representation. This way the detection problem is divided into two sub-problems, where a first problem amounts to determining a compact representation of context from the population, and a second problem amounts to detecting data comprised in the sub-population.

The methods are preferably performed using methods from machine learning. A first function f1 is configured to determine the context of the received signal, wherein the context is indicative of a state of the received signal. A second function f2 is then configured to detect the data based on a part of the received signal, wherein the second function f2 is arranged to be parameterized by the context from the first function f1.

The first function f1 can, e.g., be realized by a convolutional neural network (CNN). In deep learning, a CNN is a class of deep neural networks, most commonly applied to analysing visual imagery. They are also known as shift invariant or space invariant artificial neural networks (SIANN), based on their shared-weights architecture and translation invariance characteristics. CNNs are regularized versions of multilayer perceptrons. The output, i.e., the context, may, e.g., be a finite length vector. The dimensionality of the context c is preferably much smaller or at least smaller than a dimensionality of a receiver operating condition associated with the population, i.e., the context should be a compact representation of the receiver operating conditions.

The second function can be realized for example by a fully connected neural network (FCNN). FCNNs are a type of artificial neural network where the architecture is such that all the nodes, or neurons, in one layer are connected to the neurons in the next layer.

Both the first and the second function can of course also be realized using the same type of neural network structure, i.e., both the first and the second functions may be realized as CNNs.

Both convolution neural networks and fully connected neural networks comprise learnable weights and biases. In both networks the neurons receive some input, perform a dot product, and follows it up with a non-linear function. Neural networks are generally known and will therefore not be discussed in more detail herein.

Figure 2:
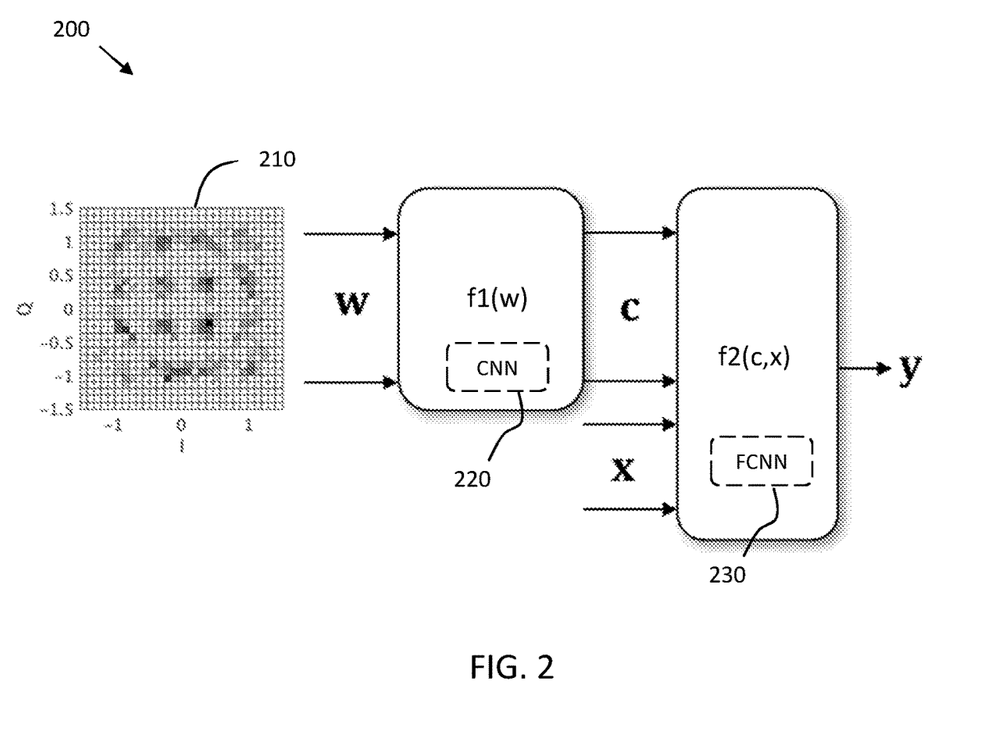
FIG. 2 illustrates adaptive processing of a received signal by first and second functions.

FIG. 2 schematically illustrates a general concept of the proposed receiver 200. A received signal w, here shown as received data symbols in an I/Q constellation plot 210, is input to the first function f1. The output of this function is a context c which is indicative of the current operating conditions of the receiver. The context c is a compact representation of the most likely complex environment in which the receiver is currently operating. This context vector may, e.g., be a vector of a certain reasonable dimension, such as between 10-20 values. The determined context c is input to the second function f2 which also takes a part of the received signal x as input. The data y to be detected in comprised in this part x. The second function then detects the data y based on the part x of the received signal and on the context c. The second function f2 can thus be said to be parameterized by the context c.

Generally, as long as the context trained on will be experienced by the receiver when deployed, and, as long as the context is capturing the relevant information needed by the receiver in the receive chain, the proposed receiver architecture 200 has the potential to be the optimal receiver structure, or at least near-optimal, in all experienced receiver conditions. Depending on the trained model used, the proposed method can enable the receiver to outperform existing methods even if the realized context is not among the one for which the model is trained for. The receiver will be able to handle varying contexts over time and/or frequency and/or space and adapt the reception of each sample to an "optimal" or at least a near-optimal performance given the conditions it is exposed to.

With continued reference to FIG. 2, the context c can be used to adapt an algorithm (making up function f2) that performs calculations on the sub-population x. The population can for instance comprise all the equalized modulation constellation symbols in a received communication symbol, e.g. using an orthogonal frequency division multiplexed (OFDM) modulation. The reference point where the population is collected can be different and could also consist of samples prior to equalization, before or after channel combining, raw I/Q samples at the antenna connector, and so on.

Note again that the examples of a CNN as the first function and an FCNN as the second function in FIG. 2 are purely by way of example and in no way limiting. As will be discussed in the following, one of the functions can be a simple function like a look-up table or the like, i.e., not even based on machine learning.

According to an example, a context vector c is first derived based on the population. In the specific embodiment of a soft bit estimator, the context vector is used by the algorithm to acquire knowledge about the distribution of symbols in order to estimate the probability of a transmitted bit to be equal to 0 or 1. After the context representation c is calculated, the soft bits can be predicted for each sample or for a sub-set of samples.

The received signal can be any set of received samples, where it is believed that the samples can be represented by the same/similar underlying distribution. According to different aspects, these are e.g. a single OFDM symbol, a slot (as defined in LTE and/or NR/5G), a radio frame (as defined in LTE and/or NR/5G), symbols received at a certain receive antenna, by different sectors/cells, and so on. Any combinations of the above-mentioned sample sets are also valid populations, e.g. all samples over one OFDM symbol and over each receive antenna.

When training the model, i.e., configuring the first f1 and the second f2 function, the training entity typically receives a set of populations, and estimates a context c for each such population. This can be done iteratively or not depending on the method chosen.

The training phase can be elaborated as:
First receive a set of populations possibly by simulating different scenarios (or collecting data received during actual communication in the communication system 100) or using measurements of some pilot signals during real time transmission.
Then, based on the set of populations, derive a context c representing a compact estimate of each population. The model can be trained iteratively by adjusting the model parameters (e.g. weight and bias values of neural networks or mean and covariance matrices for Gaussian mixture models) to minimize a given cost function. Different cost functions are possible. For instance, a cost function indicating some measure of separation between different generated contexts for populations which are known to differ may be used. For the case of end-to-end training of the models for f1 and f2, a cost function can be selected to take into account the expected discrete outcome of the detection algorithm such as binary cross-entropy.

The context c can be determined by the first function f1 using different methods. According to different aspects of the proposed technique, function f1 may be realized using, e.g.,
A fully-connected neural network (FC NN)
A convolutional neural network (CNN)
Generative models, such as (variational) auto-encoder (where the encoder part would be used to get the context), and/or restricted Boltzmann machines (RBM).
Clustering algorithms, such as Gaussian mixture models (GMM), k-means clustering, fuzzy c-means clustering
A compact representation of the estimated distribution based on an orthonormal basis of the space, i.e. Fourier series coefficients of the estimated probability density function (PDF), and
Using a kernel density estimation (KDE) method to infer the underlying distribution of the population based on finite data samples.

The prediction phase, i.e., the detection of the actual data during communication in the communication system 100, can be elaborated as:
First create a population based on a number of samples related to the received signal of interest.
Estimate the current context c based on the population, by the first function f1, where the context is a compact representation of the population
Then use the context to parameterize the processing of the received samples in the signal of interest, typically using a second function f2 that makes use of the context c to adapt its behavior to the current receiver conditions when detecting data comprised in the signal of interest.
The first function f1 which determines the context can, optionally, be updated, i.e., trained, based on the detected data output generated from the received samples The first function f1 configured to derive the context c can according to some aspects be jointly trained together with the second function f2 configured to perform the actual data detection, e.g., the soft bit calculation or Log-Likelihood Ratio (LLR) calculation. According to another example, the two functions f1 and f2 are configured, i.e., trained, separately. It is perhaps most straight forward to train the second function f2 since a detection error can be defined in a straightforward manner as the difference between true data and detected data. If the first and the second functions are trained jointly, then this detection error can be used to train also the first function. If the two functions are trained separately then metrics describing what constitutes a 'good' result in terms of context determination need to be determined. One example of such a metric is a norm difference between contexts corresponding to populations known to represent different receiver operating conditions.

Determining a suitable cost function may be challenging in general and some experimentation or simulation may be required. However, in case the system is trained end-to-end, only a single cost function is required associated with the output of the second function. For the case of soft bit estimation, this cost function may be a binary cross-entropy function defined on the bit outputs. The problem is then essentially a binary classification task, where the actual probabilities of the classes are of interest, not just the class labels.

To summarize, the methods for training the first and the second functions f1, f2 can be selected freely. For instance, they can be trained to minimize a bit error probability associated with the detected data y, or a block error rate (BLER) associated with the detected data.

In the following, a concrete example will be provided based on soft bit calculation in a discrete Fourier transform spread OFDM (DFT-s-OFDM) system. Related to the above-mentioned examples, with reference to FIG. 2, the population is collected in each OFDM slot, and a context-vector c is generated by a CNN 220 constituting a realization of the first function f1. The first function f1 is trained together with the second function f2 which is constituted by an FCNN 230 configured to perform the soft bit calculations in dependence of the context vector c from the first function.

With reference to the example shown in FIG. 2, equalized modulation constellation symbols over an OFDM slot are collected in a 2-dimensional histogram and normalized, to get an estimate of the discrete joint PDF over the modulation constellation points. This can also be viewed as a gray-scale image as shown in FIG. 2, where the probability in each bin sets the gray scale color intensity from white to black. The image 210, which is based on the selected population, is input to a CNN that generates the context c. The context c is then input to an FCNN together with other input features x specific to the sub-population. The total model produces an output y. In this specific example use-case, it is a vector of estimated soft bit values.

Interestingly, this input format is also well suited for human perception of receiver operating condition. A blurry histogram 210 is naturally interpreted as challenging while a 'cleaner' histogram where data samples are tightly grouped around constellation points is normally perceived as less challenging operating conditions.

Figure 3:
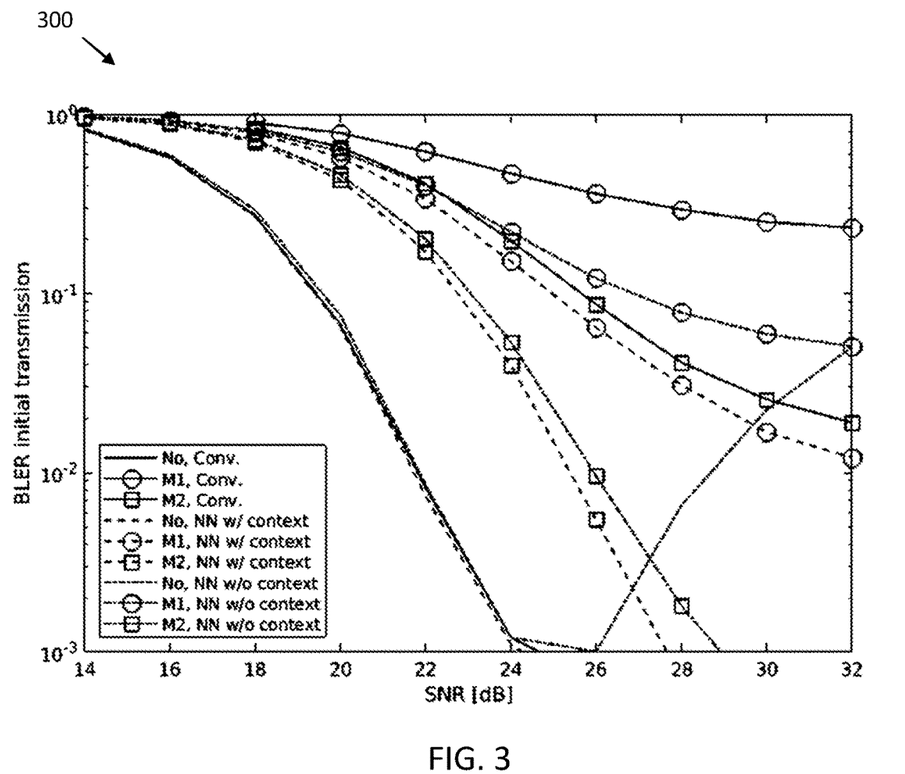
FIG. 3 is a graph illustrating block error rate (BLER) of an initial transmission vs SNR.

One example of link level performance when not making use of the context compared to making use of the context is shown in FIG. 3. FIG. 3 shows link level performance in terms of BLER for an initial transmission of a 64QAM communication signal at 100 GHz with and without phase noise impaired reception and transmission. For the different curves, 'No'—indicates no phase noise, 'M1'—indicates added phase noise based on a first phase noise model, 'M2'—indicates added phase noise based on a second phase noise model. The shown performance compares a trained model with (w/) and without (w/o) access to the determined context c from the first function f1.

As can be seen, from the three settings 'No'—no phase noise, 'M1'—phase noise model 1, 'M2'—phase noise model 2, the performance of an NN having access to the context outperforms both the conventional approach ('Conv.') and the NN trained without access to the context. It is also seen to generalize better across different SNR regions, due to a better understanding of the context it is operating in.

Figure 4:
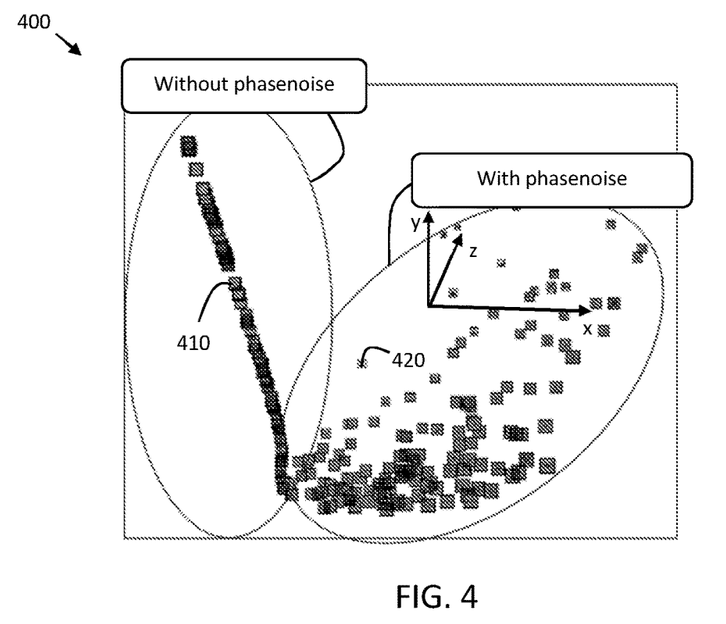
FIG. 4 is a visualization of different receiver contexts.
Figure 5:
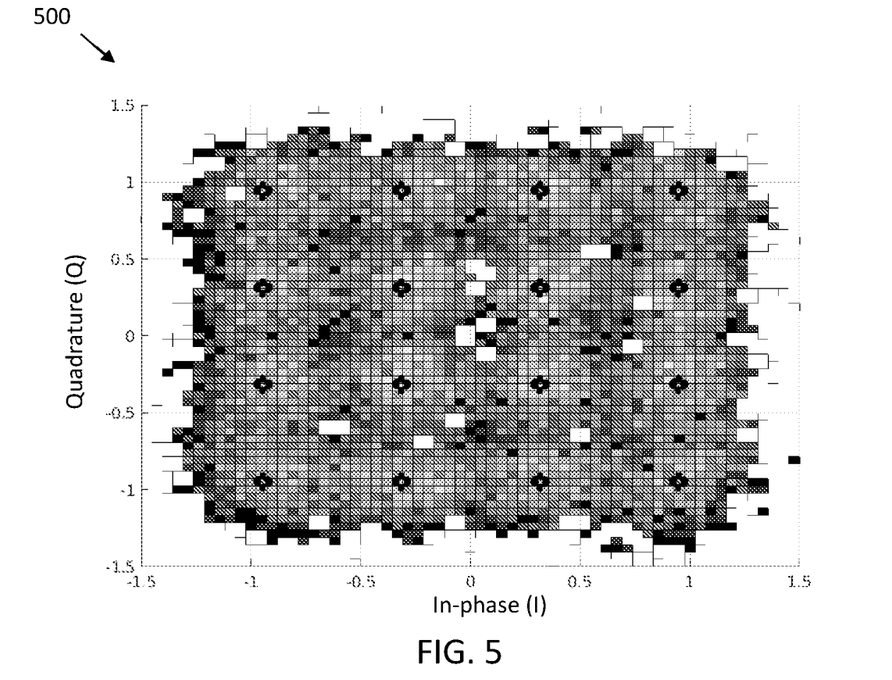
FIGS. 5-8 show signal processing of a received signal for context determination.
Figure 6:
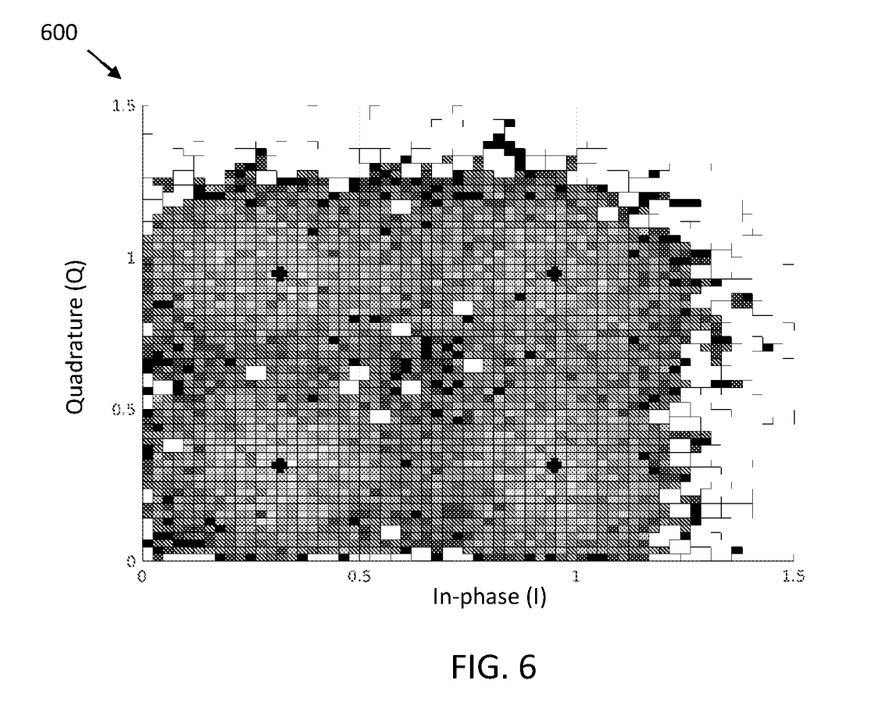

To understand a lower dimensional context better, a 32×32 gray scaled image has been passed through a CNN to a final context dimension of size 10. This has then been reduced to 3 dimensions by using principle component analysis (PCA) to promote visualization. A model has been trained on multiple scenarios of carrier frequency, phase noise models and SNR, but only exposed to two different settings: No phase noise model and the first phase noise model. FIG. 4 illustrates the results of this visualization 400. A larger number of 10-dimensional context vectors c has been reduced to three dimensions for an operating scenario without phase noise 410 and with phase noise. As expected, the differences in operating conditions are seen in the determined context c. Thus, an algorithm having access to the context c is able to adapt to current operating conditions. With reference to FIG. 5, in this example above the context is created based on a discrete joint PDF in 2 dimensions seen as a gray scale image 500. According to another example the symmetries of the QAM modulation constellation are exploited by folding the I and Q axes to a single quadrant 600 as shown in FIG. 6. For example, if folding to the first quadrant, all samples ending up on the negative Q axis is first mirrored (keeping the I value but changing the sign of the Q value) to the positive Q axis. As a second step, all negative samples on the I axis are mirrored to the positive I axis by mirroring (keeping the Q value but changing the sign of the I value).

According to yet another example, an additional mirroring can be applied and still have a rectangular image to feed into the first function f1 by converting the cartesian coordinate to polar coordinates, i.e. if the received symbol is $r = r_I + r_Q j = Ae^{j\theta}$, where $r_I$ and $r_Q$, are in-phase and quadrature parts of the received symbol respectively in the cartesian coordinate system, the polar representation is then based on A and $\theta$, i.e. the amplitude and phase of the complex number.

Figure 7:
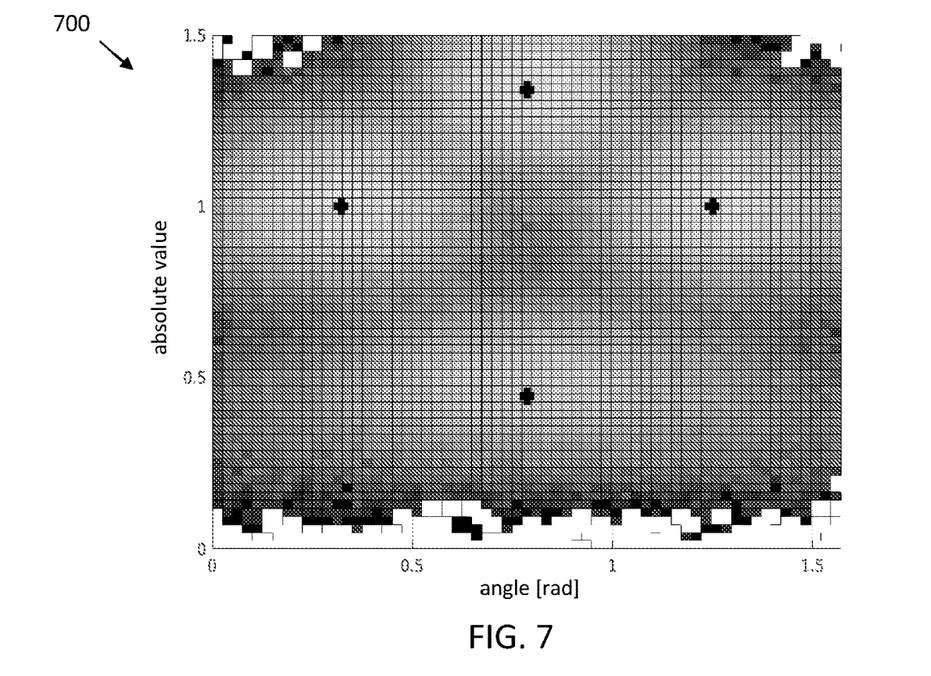
Figure 8:
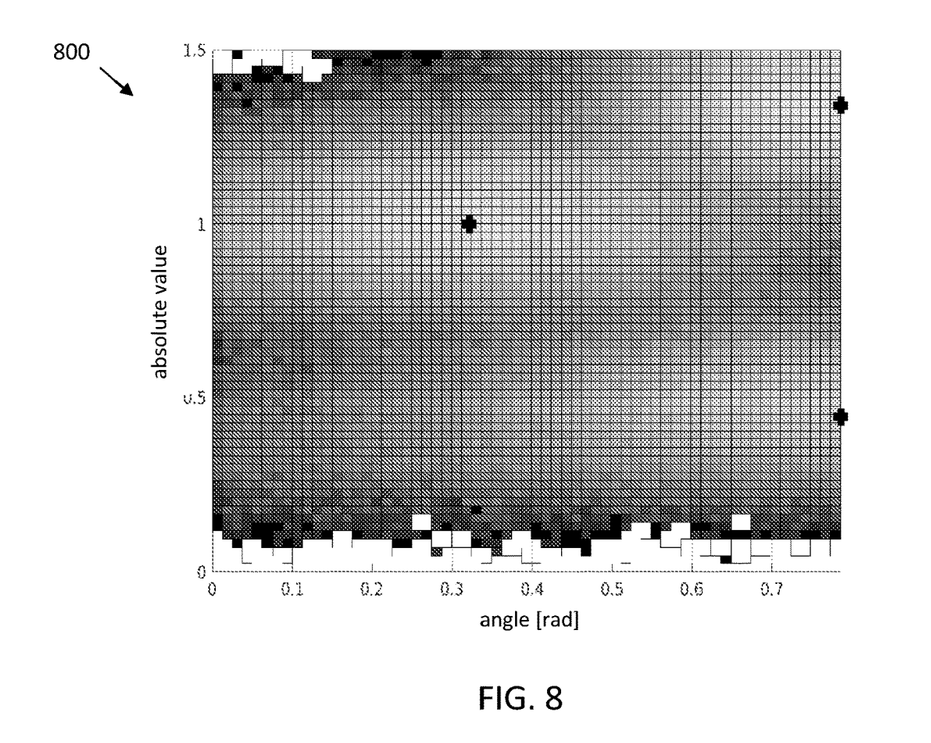

FIG. 7 shows an example polar representation 700 of the full constellation folded to the first quadrant. FIG. 8 shows the same polar representation 800 with an additional folding around the diagonal I=Q (or in polar coordinates, where the phase is $$\frac{\pi}{4} \approx 0.78 \, \text{rad}).$$

In this case the PDF is collected over 20 OFDM slots and hence provides a smoother estimate of the underlying PDF.

The context c, e.g., a context vector determined by the first function f1, can also be used to adapt between different algorithms in the receiver. The context c determined by the first function f1 can thus be used to switch between different trained models that selectively constitute the second function f2. These models are then suitable for different operating conditions. One example could be that one model is trained on a Gaussian distribution while another model is trained on a non-Gaussian distribution.

To estimate how close the received signal is to a Gaussian distribution based on the context c, the norm between a pre-calculated context for Gaussian distributions and the current context can be compared.

The selection of the embedding above can be performed based on the hardware limitations of the training entity. In another embodiment, different embedding can be tested and evaluated based on the performance for each sample (then select the best one). The selection can also be made based on the number of samples in the population.

The type of histograms exemplified in FIGS. 5-8 can be used as input to the first function, in a manner similar to that discussed above in connection to FIG. 2.

Figure 9:
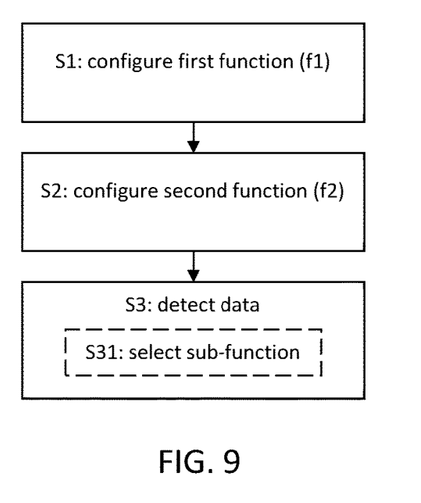
FIG. 9 schematically illustrates a communications network.

FIG. 9 is a flow chart which summarizes the discussions above. The flow chart illustrates a computer implemented method for detecting data y comprised in a part x of a received signal w of a communication system 100, such as that schematically illustrated in FIG. 1. It is appreciated that the received signal is a broad concept. This signal could for instance be comprised of a part associated with the data and some other signal from which the context is derived. It could also be according to the example discussed above where the received signal is all symbols in a slot or frame and the part is the sample from which the data is to be detected. The methods discussed herein can be performed by any of; a wireless receiver, a wireline receiver, or an optical receiver.

The received signal w may, e.g., be a modulation constellation symbol or a set of modulation constellation symbols in a received time slot or frame, and/or at a given receive antenna and/or receive sector. The modulation constellation symbol or the set of modulation constellation symbols can, for instance, be modulated according to an orthogonal frequency division multiplex (OFDM) based modulation format such as that used in the 4G and 5G communication systems defined by the 3GPP.

The received signal w is associated with a population and the part x of the received signal w is associated with a sub-population of the population. By separating the larger number of samples associated with the population from the smaller number of samples associated with the sub-population, it becomes possible to both reliably determine current receiver context and detect the data with reasonable complexity.

The methods discussed above comprises configuring S1 a first function f1 to determine a context c of the received signal w. The context c is indicative of a state of the received signal was received by the receiver. The context could for instance indicate heavy influence from multiplicative noise such as phase noise, which may prompt certain adaptations in the data detection processing by the receiver. The context could also indicate that noise and other distortion components are mainly additive in nature and follow a Gaussian distribution, which means that other methods for detecting the data may be more suitable.

The context c is, according to one way of viewing the techniques disclosed herein, indicative of a statistical distribution of received data symbols.

The methods also comprise configuring S2 a second function f2 to detect the data y based on the part x of the received signal, wherein the second function f2 is arranged to be parameterized by the context c. This means that a second function f2 is applied to the sub-population, i.e., to the part of the received signal in order to detect the data. The part of the received signal normally comprises less samples and so the detection can be made with reasonable computational complexity.

The method thus detects S3 the data y by the first f1 and second f2 functions. The functions are configured serially, where the first function determines context based on a larger number of samples of the population, while the second function focuses on data detection based on a smaller sub-population, while considering the current context as determined by the first function.

According to aspects, the context c is a finite length vector of values. This vector may, e.g., be on the order of 10-20 values, i.e., the dimension of the context vector may be between 10-20 samples and preferably about 15 samples. The dimensionality of the context c is preferably smaller than a dimensionality of a receiver operating condition associated with the population. This means that the context c is a compact representation of the actual receiver operating condition, which would have been much more complicated to describe in full. However, by the context vector, the most important parts of the receiver operating condition is captured in an efficient and compact manner.

According to a more detailed example, the first function f1 comprises any of; a fully-connected neural network, FC NN, a convolutional neural network, CNN, a generative model, a clustering algorithm such as a Gaussian mixture model, GMM, k-means clustering, or fuzzy c-means clustering algorithm, a compact representation of the estimated distribution based on an orthonormal basis of the space, such as Fourier series coefficients of an estimated probability density function, PDF, or a kernel density estimation, KDE, method configured to infer an underlying distribution of the population based on a finite set of data samples.

The first function f1 is preferably based on regression and thereby provides the compact representation of receiver condition using regression principles implemented, e.g., as a neural network. However, the first function f1 may equally well be a classifier configured to classify the received signals into one out of a pre-determined number of discrete contexts c.

The first function f1 is according to some aspects configured to process a two-dimensional histogram of equalized modulation constellation symbols in the received signal w, as discussed above in connection to FIGS. 2, 5, 6, 7 and 8.

According to aspects, the second function f2 is arranged as a soft bit estimator or to determine one or more bit Log-likelihood ratios, LLR.

According to aspects, the second function f2 is constituted by a set of sub-functions, and the method comprises selecting S31 a sub-function out of the set of sub-functions for detecting the data y based on the context c. Each such sub-function may then be associated with a respective receiver operating context c.

The first f1 and the second functions f2 may as discussed above either be trained separate from each other or jointly.

Figure 10:
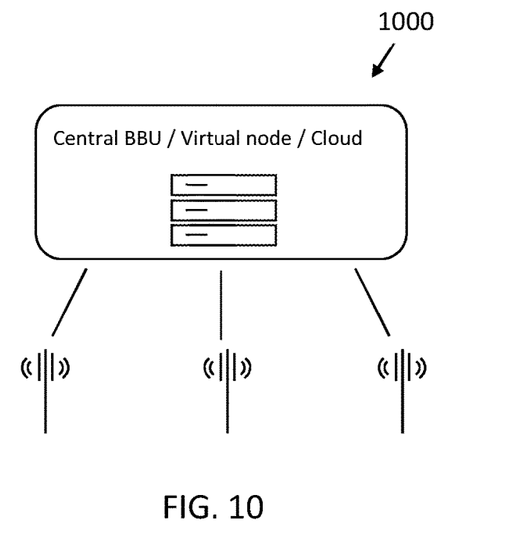
FIG. 10 is a flow chart illustrating methods in a receiver.

FIG. 10 illustrates various realizations 1100 of the methods discussed above. The methods and receivers discussed above may be implemented in a baseband processing unit (BBU) which could be deployed in a centralized manner or in a virtual node in the communications network 100. The split between the physical node and the centralized node can be on different levels, e.g. at I/Q samples level from the radio unit. Parts of the proposed methods may of course also be implemented on a remote server comprised in a cloud-based computing platform.

Figure 11:
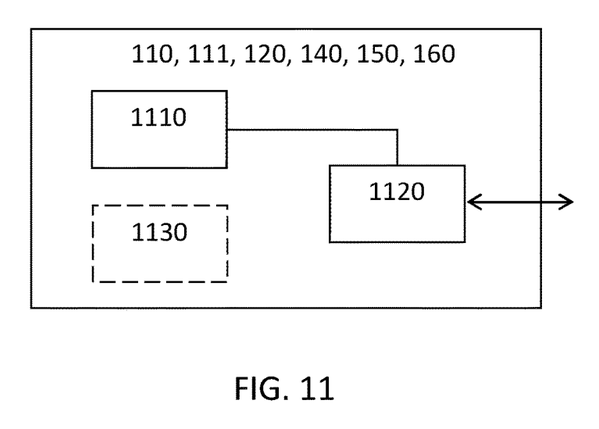
FIG. 11 schematically illustrates processing circuitry.

With reference also to FIG. 1, FIG. 11 schematically illustrates, in terms of a number of functional units, the general components of a network node 110, 111, 120, 140, 150, 160 according to embodiments of the discussions herein. Processing circuitry 1110 is provided using any combination of one or more of a suitable central processing unit CPU, multiprocessor, microcontroller, digital signal processor DSP, etc., capable of executing software instructions stored in a computer program product, e.g. in the form of a storage medium 1130. The processing circuitry 1110 may further be provided as at least one application specific integrated circuit ASIC, or field programmable gate array FPGA.

Particularly, the processing circuitry 1110 is configured to cause the device 110, 120 to perform a set of operations, or steps, such as the methods discussed in connection to FIG. 8 and the discussions above. For example, the storage medium 1130 may store the set of operations, and the processing circuitry 1110 may be configured to retrieve the set of operations from the storage medium 1130 to cause the device to perform the set of operations. The set of operations may be provided as a set of executable instructions. Thus, the processing circuitry 1110 is thereby arranged to execute methods as herein disclosed. In other words, there is shown a network node 110, 111, 120, 140, 150, 160, comprising processing circuitry 1110, a network interface 1120 coupled to the processing circuitry 1110 and a memory 1130 coupled to the processing circuitry 1110, wherein the memory comprises machine readable computer program instructions that, when executed by the processing circuitry, causes the network node to:

configure S1 a first function f1 to determine a context c of the received signal w, wherein the context c is indicative of a state of the received signal w, configure S2 a second function f2 to detect the data y based on the part x of the received signal, wherein the second function f2 is arranged to be parameterized by the context c, and detect S3 the data y by the first f1 and second f2 functions.

The storage medium 1130 may also comprise persistent storage, which, for example, can be any single one or combination of magnetic memory, optical memory, solid state memory or even remotely mounted memory.

The device 110, 120 may further comprise an interface 1120 for communications with at least one external device. As such the interface 1120 may comprise one or more transmitters and receivers, comprising analogue and digital components and a suitable number of ports for wireline or wireless communication.

The processing circuitry 1110 controls the general operation of the device 110, 120, e.g., by sending data and control signals to the interface 1120 and the storage medium 1130, by receiving data and reports from the interface 1120, and by retrieving data and instructions from the storage medium 1130. Other components, as well as the related functionality, of the control node are omitted in order not to obscure the concepts presented herein.

Figure 12:
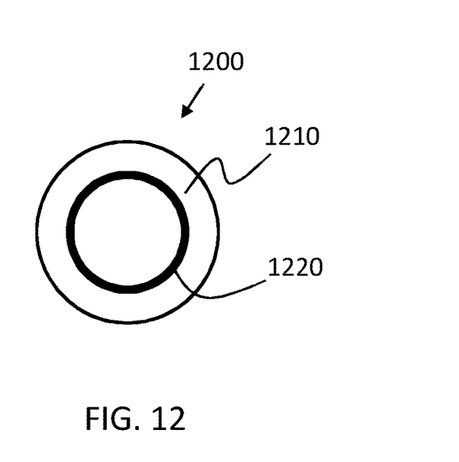
FIG. 12 shows a computer program product.

FIG. 12 illustrates a computer readable medium 1210 carrying a computer program comprising program code means 1220 for performing the methods illustrated in, e.g., FIG. 9, when said program product is run on a computer. The computer readable medium and the code means may together form a computer program product 1200.

The invention claimed is:

1. A computer-implemented method for detecting data comprised in a part of a received signal of a communication system, wherein the received signal is associated with a population and where the part of the received signal is associated with a sub-population of the population, the method comprising:
configuring a first function to determine a context of the received signal, wherein the context is indicative of a state of the received signal;
configuring a second function to detect the data based on the part of the received signal, wherein the second function is arranged to be parameterized by the context; and
detecting the data by the first and second functions.

2. The method according to claim 1, wherein the context is a finite length vector of values.

3. The method according to claim 1, wherein a dimensionality of the context is smaller than a dimensionality of a receiver operating condition associated with the population.

4. The method according to claim 1, performed by any of:
a wireless receiver;
a wireline receiver; or
an optical receiver.

5. The method according to claim 1, wherein the received signal is a modulation constellation symbol or a set of modulation constellation symbols in a received time slot or frame, and/or is received at a given receive antenna and/or receive sector.

6. The method according to claim 5, wherein the modulation constellation symbol or the set of modulation constellation symbols are modulated according to an orthogonal frequency division multiplex (OFDM) based modulation format.

7. The method according to claim 1, wherein the first function comprises any of:
a fully-connected neural network (FC NN);
a convolutional neural network (CNN);
a generative model;
a clustering algorithm such as a Gaussian mixture model (GMM);
k-means clustering;
a fuzzy c-means clustering algorithm;
a compact representation of an estimated distribution based on an orthonormal basis of a space, such as Fourier series coefficients of an estimated probability density function (PDF); and
a kernel density estimation (KDE) method configured to infer an underlying distribution of the population based on a finite set of data samples.

8. The method according to claim 1, wherein the first function is based on regression.

9. The method according to claim 1, wherein the first function is a classifier configured to classify the received signals into one out of a pre-determined number of discrete contexts.

10. The method according to claim 1, wherein the context is indicative of a statistical distribution of received data symbols.

11. The method according to claim 1, wherein the first function is configured to process a two-dimensional histogram of equalized modulation constellation symbols in the received signal.

12. The method according to claim 1, wherein the second function is arranged as a soft bit estimator or to determine one or more bit Log-likelihood ratios (LLR).

13. The method according to claim 1, wherein the second function is constituted by a set of sub-functions, and wherein the method further comprises selecting a sub-function out of the set of sub-functions for detecting the data based on the context.

14. The method according to claim 13, where each sub-function is associated with a respective receiver operating context.

15. The method according to claim 1, wherein the first and second functions are trained separately from each other.

16. The method according to claim 1, wherein the first and second functions are trained jointly.

17. A non-transitory computer readable medium having a computer program stored thereon, the computer program comprising program code stored thereon that, when executed by processing circuitry of a network node, causes the network node to:
configure a first function to determine a context of the received signal, wherein the context is indicative of a state of the received signal;
configure a second function to detect the data based on the part of the received signal, wherein the second function is arranged to be parameterized by the context; and
detect the data by the first and second functions.

18. A network node comprising:
processing circuitry;
a network interface coupled to the processing circuitry; and
a memory coupled to the processing circuitry, wherein the memory comprises machine readable computer program instructions that, when executed by the processing circuitry, causes the network node to:
configure a first function to determine a context of a received signal, wherein the context is indicative of a state of the received signal,
configure a second function to detect data based on a part of the received signal, wherein the second function is arranged to be parameterized by the context, and
detect the data by the first and second functions.

* * * * *